UNITED STATES PATENT OFFICE.

ALBERT LECOEUR, OF ROUEN, FRANCE.

PURIFICATION OF AMMONIACAL COPPER SOLUTIONS.

No. 863,801.

Specification of Letters Patent.

Patented Aug. 20, 1907.

Application filed August 4, 1906. Serial No. 329,173.

*To all whom it may concern:*

Be it known that I, ALBERT LECOEUR, of 98 Avenue du Montriboudet, Rouen, (Seine Inferieure,) France, manufacturer, have invented certain new and useful Improvements in or Relating to the Purification of Ammoniacal Copper Solutions, of which the following is a specification.

Ammoniacal solutions of hydrated cupric oxid as used industrially for dissolving the cellulose in the manufacture of artificial silk and the like contain impurities consisting chiefly of crystalloid salts which prejudicially affect the solution of the cellulose and soon destroy the solvent power of the ammoniacal copper liquors. This practical difficulty is overcome by the present invention.

According to the invention I subject an ammoniacal solution of hydrated cupric oxid to dialysis in any suitable dialyzing apparatus for the purpose of removing the said crystalloid salts. The said impurities can be readily separated in this way as they diffuse much more rapidly than the active constituent of the solution, which is the colloidal hydrated cupro-ammonium oxid. By this means a purified stable solution of hydrated cuprammonium oxid can be obtained.

The identity of the crystalloid substances and impurities present in the solutions depends upon the materials from which they are prepared. For example, if they are prepared by adding ammonia to a solution of cupric sulfate the principal crystalloid impurity present in the solution will be sulfate of ammonia. If prepared from chlorid of copper, caustic soda and ammonia, sodium chlorid will be the crystalloid impurity. Again, if the ammoniacal copper solution is prepared by oxidizing metallic copper with air in presence of ammonia, copper nitrite and ammonium nitrite are examples of the crystalloid salts which will be contained in the solution.

The practical difficulty above referred to is overcome by the present invention, which is applicable to ammoniacal solutions of hydrated cupric oxid however prepared.

I have found in practice that the dialyzed hydrated cuprammonium oxid solutions keep limpid at ordinary temperatures without undergoing decomposition, and when employed for the treatment of cellulose they yield uniform viscous solutions of cellulose which can be kept without the intervention of cold.

Any convenient form of dialyzing apparatus may be employed for carrying out the invention.

The diaphragms or septa employed should be of suitable porosity since if they are not sufficiently porous the dialysis takes too long and decomposition is liable to occur while if they are too porous water may return through them into the solution and detrimentally affect the result. In practice I have found that porcelain diaphragms of suitable porosity give good results. The operator accustomed to dialyzing work will be able to determine the most suitable porosity by a few trials.

One example of a suitable material for forming the diaphragms is what is known as "asbestos porcelain", i. e. porcelain made with asbestos. The diaphragms of this material with which the best results are obtained will absorb about half their weight of water; this amount may vary slightly according to the firing.

One sample of asbestos porcelain which has been employed with advantage weighed when dry 50 grams, and after immersing in distilled water weighed 75 grams. If the proportion of nitrates, for example, present in the solution is 5 grams and 1 liter, one square meter of diaphragm surface will purify about 40 liters of ammoniacal solution in an hour.

The dialysis is stopped when the solution has been freed to the required extent from the impurities, which can be ascertained by testing the liquors from time to time as will be well understood.

What I claim and desire to secure by Letters Patent is:—

1. In and for the manufacture of ammoniacal copper solutions suitable for use as cellulose solvents in the production of artificial silk and the like, the purification of a solution of hydrated cuprammonium oxid by subjecting the same to dialysis, substantially as described.

2. As a new article of manufacture, a solution of colloidal hydrated cuprammonium oxid substantially free from crystalloid salts substantially as described.

In witness whereof, I have hereunto signed my name in the presence of two subscribing witnesses.

ALBERT LECOEUR.

Witnesses:
  OSCAR MALMROS,
  PAUL RUDOLF.